Aug. 10, 1948.　　　　F. M. BROWN　　　　2,446,628
FLATNESS TESTING APPARATUS
Filed March 6, 1947
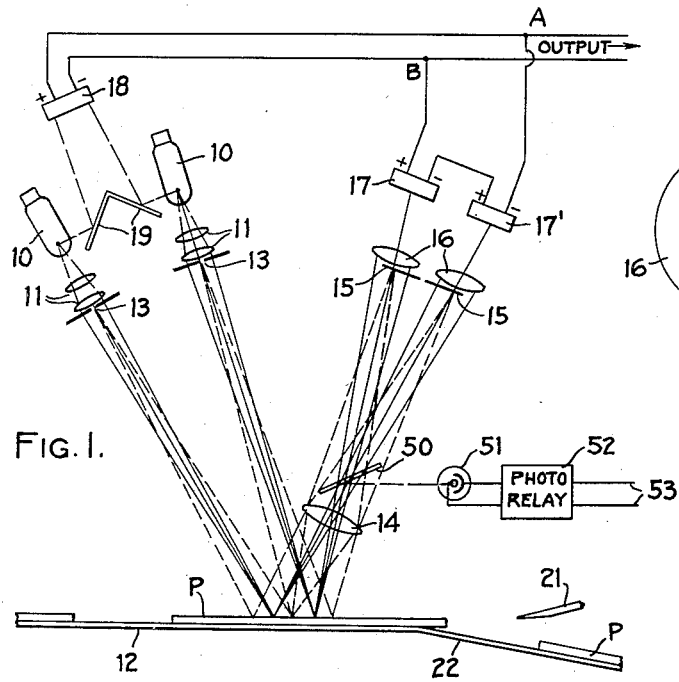
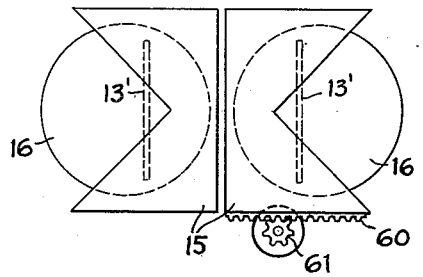
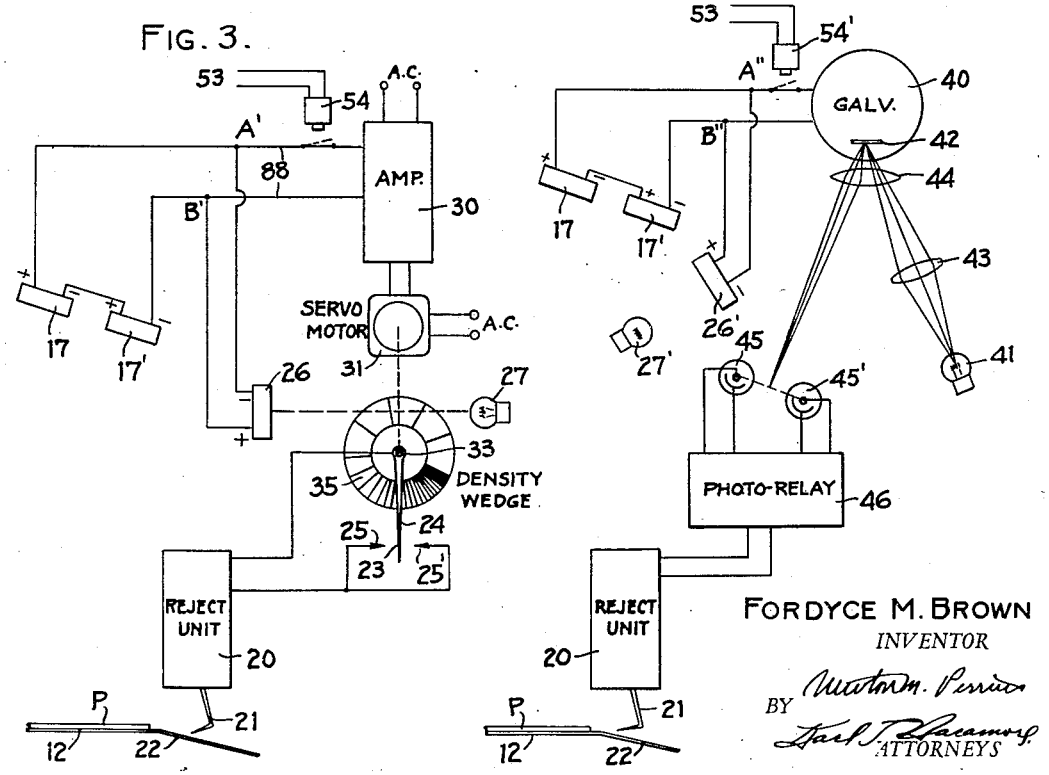
FORDYCE M. BROWN
INVENTOR Patented Aug. 10, 1948

2,446,628

UNITED STATES PATENT OFFICE 2,446,628

FLATNESS TESTING APPARATUS

Fordyce M. Brown, Rochester, N. Y., assignor to Eastman Kodak Company, Rochester, N. Y., a corporation of New Jersey Application March 6, 1947, Serial No. 732,683

12 Claims. (Cl. 250—41.5)

This invention relates to a device for measuring the flatness of glass, or similar materials.

There are many applications of glass in plate or sheet form which require that the flatness of the surface be held within certain limits. For instance, in the photographic industry, certain jobs require what is known as photographic plates and which are glass plates coated with a light-sensitive emulsion. It is quite essential that the glass plates for this application be free from curvature and ripples, so that the entire light-sensitive surface can be accurately located in the focal plane of the camera.

There are optical flatness testers available and in use now, but since they require the services of a plurality of operators and visual inspection, they are necessarily slow and the results are subject to personal judgment and fatigue. Consequently, these testers are used only for checking large glass plates, and glass for special orders, and no attempt is made to use them in the routine production of the smaller photographic plates, other than for spot-checking purposes.

One object of the present invention is to provide a device for measuring the flatness or the deviation from flatness of a reflecting surface.

Another object is to provide such a device which is rapid and automatic in operation, and adapted to the continuous inspection of plates moving along on a conveyor system.

A further object is to provide a device of the type set forth which will reject, or indicate for rejection, any plate whose flatness does not come within certain specified tolerances.

And yet, another object is to provide a device of the type set forth which permits the plate being measured to shift from a given measuring plane by a substantial amount without affecting its ability to measure flatness of the plate accurately.

And still another object is to provide a device of the type set forth which includes means for cutting out the effects of second surface reflection when the plates being measured are transparent.

Another object is to provide a device of the type set forth wherein the glass may be fed on a conveyor belt past one or more measuring stations. Regardless of the absolute position of the glass within reasonable limits, e. g., + or —, $\frac{1}{16}$-inch tilt along either axis, out of tolerance glass may be indicated and subsequently eliminated automatically without the attention of an operator.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which Fig. 1 is a diagrammatic showing of an electro-optical system constructed in accordance with a preferred embodiment of the present invention;

Fig. 2 is an enlarged detail showing the shape and arrangement of the masks located in front of the measuring light-sensitive cells and showing their relation to the reflected images of the optical slits projected onto the cells;

Fig. 3 is a diagrammatic showing of a preferred form of electrical control for use with the system of Fig. 1, and for automatically indicating for rejection plates which are not flat within certain tolerances; and Fig. 4 is a diagrammatic showing of another embodiment of electrical control for automatically rejecting curved plates.

Like reference characters refer to corresponding parts throughout the drawings. According to my invention, the flatness of a glass plate or other reflecting surface is determined by projecting two substantially congruent light areas onto the surface to be tested in known spaced relation and projecting the images of these areas reflected from the surface onto means for judging the spacing of the projected images. After the system is once adjusted with a flat reflecting surface in measuring position, then, so long as the spacing between the reflected images remains constant, it is known that the reflecting surface in measuring position in the system is flat. This condition will remain true even if the surface being tested should tilt from the measuring plane by a substantial amount, because such a tilting of the surface would cause both reflected images to shift in the same direction and by the same amount, so that their relative spacing would not be altered.

If, however, a curved plate is moved into the system, the cylindrical power of the system for projecting the reflected images will be altered and the relative spacing of the reflected images will be altered from the constant value, thus indicating that the plate being measured is curved.

While this condition could be observed directly on a measuring scale onto which the reflected images are projected, I prefer to remove the necessity for visual inspection. To this end, I provide two serially-connected photocells onto which the separate reflected images are projected and cover these cells with a mask arrangement which will cause the sum of the output of the two cells to remain constant so long as the surface being tested is flat, but will cause the cell output to vary from said constant value when a curved surface is introduced into the system. By using an electrical control system responding to the output of the photocells, I am able to make the system automatically indicate for rejection plates having surfaces which are out of tolerance, so far as flatness is concerned.

The electrical part of the system is also rendered automatically compensating for variations in the intensity of the light source forming the light areas due to uncontrollable line voltage fluctuations. The control part of the system is also automaticaly paralyzed when both light areas are not reflected from a surface, thus adapting the system to conveyor belt inspection of plates by accounting for spaces between successive plates on a moving belt.

Referring now to the drawings, and particularly Figs. 1 and 2, a preferred embodiment of the measuring portion of the present invention will be described. The line filaments of a pair of small wattage exciter lamps 10 are imaged by two lenses 11 onto the upper surface of a glass plate P, the flatness of which is to be determined. The glass plates P are continually moved through the measuring position by a conveyor belt 12 which is continually driven by any suitable drive, not shown, and onto which belt the plates are placed in spaced relation in advance of the measuring station by an operator. An optical slit 13, or its equivalent, is placed over each of the lenses 11, so that a pair of light areas, corresponding to the shape of the slit, is projected at an angle onto the surface of the plate in constant spaced relation. The optical slits 13, or their equivalent, should be substantially congruent so that the light areas they form will be alike for measuring purposes.

The images of the optical slits reflected from the surface of the plate P are imaged by a large lens 14 onto a pair of wedge-shaped masks 15, shown in detail in Fig. 2. A final pair of lenses 16 image the reflected images of the filaments on two light-sensitive cells 17 and 17', herein shown as being of the barrier layer type, which are connected in series relation, as indicated by the polarity signs, so that their outputs add together. It will be readily appreciated that the pair of lenses 16 could be replaced by a single large lens, if desired. A flat piece of glass will reflect the two slit images up to the plane of the masks 15 with a certain separation between the images. In Fig. 2, the reflected slit images are shown in the relation they will assume relative to the masks 15 and are designated as 13'. If a flat piece of glass should tilt in the measuring plane, it would merely cause both reflected images 13' to shift by the same amount in the same direction, but would not alter the relative separation of the images. This fact makes it possible to feed the plates P through the measuring plane by means of a conveyor system, since the plane in which the plate is held during measurement is not critical. However, should a curved plate be moved into the measuring system, the cylindrical power of the system is changed and the separation of the slit images is altered.

Thus, a variation in the relative separation of the reflected slit images 13' from the value obtained when the system is initially adjusted by the use of a flat surface, is relied upon to indicate a curved surface. It will be appreciated that this end could be served by projecting the slit images onto a measuring scale located at the plane of the masks 15, instead of using the masked photocells, and relying upon an observer to notice when the spacing between the images varies from the constant value. While such an arrangement would be operative, it would depend upon visual inspection, would be slow, and would be subject to personal judgment and fatigue. Consequently, I have chosen to make the measuring system electrical and automatic by the combined use of the set forth light-sensitive cells and masks.

In initially adjusting the device, the light-sensitive cells 17 and 17' must be balanced and, if it is not possible to find two cells which are balanced as to their output, then the width of one of the optical slits 13 can be adjusted relative to the other until the output of the two cells 17 and 17', taken separately, are the same. Then, with a flat reflecting surface in the measuring plane, the spacing between the masks is adjusted until each mask lets through the same amount of each of the slit images to the photocells and the combined output of the cells is noted and is used as the reference or constant value obtained by the use of a flat reflected surface. With the parts adjusted as described, should a flat plate be supported in a slightly tilted position in the measuring plane, then the two slit images will move in the same direction relative to the masks but the spacing between them will remain constant. While such a shifting of the images will cause the individual output of the two cells to vary, by virtue of the mask construction and arrangement as the amount of one slit image passing through its respective mask increases or decreases, the amount of the other slit image passing through its mask will decrease and increase respectively by corresponding amounts. Consequently, while the individual outputs of the two cells may vary, the sum of their outputs will remain constant and equal to the constant value for which the device is initially adjusted. On the other hand, if a curved plate is introduced into the system and the cylindrical power of the system is thereby altered, then the relative spacing of the slit images 13' will vary from the constant value and the relationship of the amounts of light passing to the cells will be upset and the combined output of the cells will increase, or decrease, relative to said constant value depending upon whether the surface of the plate is curved, convex, or concave. To eliminate the effect of uncontrollable fluctuations in the voltage of the line feeding the lamps 10, the output of the measuring cells 17 and 17' is bucked by a compensating light-sensitive cell 18 whose output is dependent upon the brightness of the lamps. As shown in Fig. 1, the compensating cell 18 is illuminated by both lamps 10 by reflection from the mirrors 19. This cell 18 is then connected in a closed loop in bucking relation with the measuring cells 17 and 17'. The system is initially adjusted so that when the output of the two measuring cells 17 and 17' is equal to the constant reference value, then the potential across the points A and B of the closed loop circuit will be zero. Any uncontrollable changes in intensity of the lamps 10 will necessarily alter the output of the measuring cells 17 and 17' but, at the same time, the output of the compensating cell 18 will be correspondingly altered, so that the potential across points A and B of the photocell circuit will remain zero. Thus, if an electrical measuring instrument is connected across points A and B of the photocell circuit an indication of current flow from the loop or an indication of potential across points A and B will show the presence of a curved plate in the measuring plane of the device.

In order to render the system fully automatic and completely independent of visual inspection and personal supervision, I have devised control means responsive to the output of the photocell measuring circuit for automatically rejecting plates, the flatness of which are not within certain prescribed tolerances.

In Fig. 3 I have shown a preferred embodiment of such a control means which I will now proceed to describe. The means for rejecting curved plates or indicating them for rejection may be of any suitable type. For purposes of illustration, I have shown a rejection unit consisting of a box 20 from which extends a pivoted hook 21 cooperating with an inclined portion 22 of the conveyor belt so that when the hook is pivoted forwardly from its normal inoperative position shown, it will hook under the leading edge of the plate, leaving the measuring position before it starts down the incline (see Fig. 1) and either knock the plate off the conveyor belt onto another belt, not shown, or turn it askew on the same belt to indicate its being a reject. The hook 21 of the reject unit is normally held in an inoperative position, as shown in the drawing, and the box 20 may include a solenoid mechanism, or the like, for pivoting the hook to an operative position when the solenoid is energized. The control circuit of the rejection unit includes a normally-opened switch 23 which is closed when the rotatable switch arm 24 contacts either one of the terminals 25 or 25'.

The problem now is to leave the switch arm 24 in its neutral or switch-open position, shown in Fig. 3, when a flat plate is moved through the device, and to rotate the switch arm into one of its switch-closing positions when a curved plate moves through the device. In other words, the switch arm 24 must be moved toward a switch-closing position in response to the sum of the outputs of the two photocells 17 and 17' exceeding or falling below the constant reference value for a flat plate. To this end, the serially-connected photocells 17 and 17' are connected in a closed loop circuit in bucking relation with a standard potential which is shown as a photovoltaic cell 26 illuminated by a lamp 27 whose intensity is such that the output of the cell 26 will be equal and opposite the constant value of the outputs of cells 17 and 17'. Thus, any potential across A' and B' of this photocell circuit will indicate the presence of a curved plate in the device.

In order to detect the presence of an output in the photocell circuit and to drive the switch arm 24 toward a switch-closing position in response thereto, I make use of a Brown "continuous balance" unit, made and sold by the Brown Instrument Company. Since this continuous balance system is commercially available and is described in publications, including Patent U. S. 2,300,742, issued November 3, 1942, and the technical journal entitled "Instrumentation" (Instrument Technology), vol. I, No. 1, 1943, pp. 7–12 (incl.), a detailed explanation and showing of the structure of the same is not deemed necessary herein. Instead, this Brown control unit is only diagrammatically shown and only its principle of operation will be described.

This Brown control unit comprises a converter, an input transformer, and voltage and power amplifiers which are all shown in a box 30 and labeled "Amp." The unit also includes a 2-phase reversible induction motor 31, one phase of which is connected to the output of the power amplifier and the other phase of which is connected to an A.-C. source. The energizing coil of the converter and the primary of the input transformer of the unit are connected to an A.-C. source, also as indicated. The output of the photocell measuring circuit is connected into the control unit by leads 88, one of these leads being connected to a tap on the secondary of the input transformer and the other connected to the vibrator of the converter. Energization of the reversible motor depends upon an output from the power amplifier 39 which, in turn, depends upon an input from the photocell measuring circuit. Consequently, when a flat plate is in the measuring plane of the device there will be no potential across points A' and B' of the photocell circuit, or there is no input to the amplifier 30, so that motor 31 remains stationary. The motor is in driving engagement with shaft 33 on which switch arm 24 is mounted, so that when the motor is stationary, the switch arm is in its neutral position and the reject unit is inoperative. It might be mentioned that whenever the motor 31 is stationary, it means that the photocell circuit is in balance, or that there is no potential across points A' and B' because this is a characteristic of the control unit from whence it gets the name "continuous balance" system.

Should a curved plate move into the measuring device, the balance condition of the measuring circuit will be momentarily upset and there will occur a potential across points A' and B' which will cause a small D.-C. input to the converter of the amplifier and having a polarity dependent upon whether the output of the measuring circuit is above or below the standard value. The converter and input transformer will convert the D.-C. output to an alternating voltage of proportional magnitude which is timed with the A.-C. supply voltage to the transformer in such a way as to identify whether the measuring cell E. M. F. is above or below the point of balance and consequently to give the proper direction of rotation to the motor 31. In the present application of the control unit, the direction of rotation of the motor is not important, since I am only interested in the plate being flat or curved and not in the direction of curvature but, since the control unit has this directional function, the switch 23 must be made one of the double pole type as shown. The induced alternating signal from the input transformer is increased in amplitude and power by the use of thermionic tubes in the voltage and power amplifiers.

The current output from the power amplifier is connected to the reversible balancing motor 31 which functions to convert the amplified unbalance in the measuring photocell circuit into mechanical motion. Balancing of the measuring circuit is accomplished in the present instance by rotation of an optical density wedge 35 located between the lamp 27 and the standard or reference cell 26. The density wedge 35 is mounted on the shaft 33 to be rotated by the motor and the motor will rotate this wedge in the proper direction to compensate for any unbalance in the measuring photocell circuit.

Reviewing the operation of this control, so long as a flat plate is in the flatness-measuring device, the output of the measuring cells 17 and 17' will be equal and opposite to the output of the reference cell 26 so that there will be no input to the amplifier 30 of the control system. Since the photocell circuit is in balance, the motor 31 will be stationary in its neutral position so that switch arm 24 will be in its switch-open position shown and wherein the circuit to the reject unit 20 will be open. Now, if a curved plate moves into the device, the sum of the outputs of cells 17 and 17' will vary from the standard value and the balance of the photocell loop circuit will be upset causing an output to be fed into the amplifier 30 of the control unit. Depending upon the polarity of the input to the amplifier, the motor 31 will start to drive the density wedge in the proper direction to again balance the photocell loop and in so doing will rotate switch arm 24 into contact with one of the switch terminals 25 or 25' and close the circuit of the reject unit 20, whereupon the same will operate to indicate the curved plate for rejection. It will be appreciated that the spacing of the terminals 25 and 25' from the neutral position of switch arm 24 will determine the tolerance allowed in the curvature of a plate before it is rejected. This type of control is very sensitive and rapid in response so that the conveyor can feed the plates P through the test at a fairly rapid rate. The only limitation on the feed of the complete system is that the plates P must not be fed onto the conveyor so that the spacing between successive plates P is less than the spacing between the slit images directed onto the measuring plane, for then it would be possible to have one slit image reflected from the trailing end of one plate while the other is being reflected from the leading end of the succeeding plate.

There is some difficulty in obtaining an accurate and representative linear response by the use of the rotating wedge 35 so that the balancing of the circuit by the use of this arrangement is not completely satisfactory for very accurate operation. A much better and more accurate way of obtaining a balance of the photocell circuit is by an adjustment of one of the wedge-shaped masks 15 relative to the other until the output of the two measuring cells 17 and 17' is equal to the constant value. This can be done as shown in Fig. 2 by having the lower edge of the right-hand mask 15 provided with a rack 60 which is in driving engagement with a pinion 61 which is in turn driven by the reversible motor 31 of the reject control system shown in Fig. 3. This arrangement would eliminate the use of the reference cell 26, the lamp 27, and the density wedge 35, forming a part of the balancing system shown in Fig. 3. With this adjustable mask arrangement, the photocell measuring circuit will be the same as that shown in Fig. 1 and consisting of a loop circuit with the serially-connected cells 17 and 17' opposed by the compensating cell 18.

With this arrangement, when a curved plate is introduced into the measuring device, the spacing of the reflected slit images on the wedge-shaped masks will vary from the standard value and the sum of the outputs of the cells 17 and 17' will vary from the constant value. This will cause an unbalance of the photocell circuit and result in an input to the amplifier 30 so that the motor 31 will be started in a direction to correct the condition of unbalance. The motor through the rack 60 and pinion 61 will thus cause the right-hand mask 15 (see Fig. 2) to be adjusted relative to the other mask until the sum of the outputs of the two cells is equal to the constant value and the photocell circuit is balanced. During its balancing operation the motor 31 will swing the switch arm 24 into switch-closing position with one of the contacts 25 or 25' and cause the reject unit to be operated to indicate for reject the plate leaving the measuring position. This form of balanced control is more satisfactory than that making use of the rotatable density wedge 35, and its associated parts, not only because it is much more simple in construction and requires the use of less parts which are subject to variation in response and which are dependent on one another, but because the response obtained is a linear one corresponding to the intensity of lamps 10 irrespective of uncontrollable variations in the intensity thereof.

In Fig. 4 I have shown another type of electrical reject control which might be used with the present surface flatness measuring device. With this control, the same type of electrically-operated reject unit 20 may be used, as shown in the arrangement of Fig. 3, but, here, the operation of the reject unit in response to the presence of a curved plate is dependent upon the energization of a galvanometer. As before, the serially-connected measuring photocells 17 and 17' are connected in a loop circuit in bucking relation to a standard potential comprising a photovoltaic cell 26' illuminated by a lamp 27', or some other suitable form of constant potential. A standard galvanometer 40 is connected to the terminals A'' and B'' of the loop circuit so that it will be energized whenever there is an unbalance in the photocell circuit caused by the presence of a curved plate in the measuring device. A beam of light from lamp 41 is imaged on the mirror 42 of the galvanometer by lenses 43 and 44 while the light reflected from the mirror is imaged by lens 44 in the plane of the photoelectric cells 45 and 45'. Cells 45 and 45' control the operation of a conventional photoelectric relay 46 which, in turn, is connected to and controls the closing of the circuit of the reject unit 20.

When a flat plate is in the measuring device, the photocell measuring circuit will be balanced, no input will go to the galvanometer, so that its mirror will assume its neutral position shown and the beam of light reflected thereby will fall between the cells 45 and 45' and they will remain dark. The hook-up is such that so long as the cells 45 and 45' remain dark, the photo-relay will remain inoperative and leave the circuit of the reject 20 open.

Now, if a curved plate moves into the measuring device, the output of the cells 17 and 17' will increase, or decrease, relative to that of the standard cell 26', and produce an unbalance in the loop circuit which will cause an input of certain polarity to the galvanometer. This input will cause the galvanometer mirror 42 to swing clockwise or counter clockwise, depending upon the polarity of the input, and when the reflected beam strikes one of cells 45 or 45', the photoelectric relay 46 will be energized to close the circuit of reject unit 20. This reject unit will then operate so that its hook 21 will engage the plate P in measuring position and indicate it for rejection.

It is desirable to provide some means of paralyzing the electrical control systems described during the interval when one plate has just left the measuring station in the device and until the succeeding plate reaches the measuring position so that the controls will not be repeatedly attempting to balance the measuring photocell circuit when only one slit image is being reflected from a single plate, or when the suit images are reflected from the surface of the conveyor belt if it should have a reflecting surface.

This may be accomplished by the paralyzing circuit shown diagrammatically in Figs. 1, 3, and 4. As shown in Fig. 1, a semi-transparent mirror 50 may be disposed in the optical system of the device where the rays of the two reflected images cross. This mirror 50 reflects light from both reflected beams onto a photoelectric cell 51 which is, in turn, connected to a conventional type of photo-relay 52. This photo-relay 52 may be connected to the control systems of Figs. 3 and 4 in any manner so that operation of the photo-relay from its normal position will cause a paralyzing of the reject control system. For purposes of illustration, I have shown the photo-relay 52 connected by leads 53 to a relay 54 or 54' controlling the input circuit to the amplifier 30 of Fig. 3 or the input circuit to the galvanometer 40 of Fig. 4, respectively. The parts of the paralyzing circuit are so adjusted that so long as the photocell 51 receives light from both reflected slit images, the photo-relay 52 will be held in a condition allowing relays 54 or 54' to remain unenergized, thus leaving the input circuits to the amplifier 30 or to the galvanometer 40 closed. On the other hand, if the photocell 51 receives light from only one reflected slit image, or neither one thereof, its output will fall to a point permitting photo-relay 52 to operate and energize the relays 54 and 54' to open the input circuits to the amplifier 30 or galvanometer 40. With this arrangement, the reject control system will be inoperative at all times when both slit images are being reflected from the surface of a plate P. It is obvious that since the photocell 51 will receive but a small amount of light, the output thereof will probably have to be amplified in order to operate the photo relay 52, but for sake of simplicity this part has been omitted from the diagrammatic showing of the paralyzing circuit.

In use, the present device has been found to detect and reject curved glass plates without apparent harmful effect from second surface reflections, but the detection of ripples is difficult in most cases. However, in certain uses, the curvature of the glass is of primary importance and rippled defects are not too troublesome. If the same general optics were made of quartz and if the radiation was filtered to limit the wave length to below 3000 angstrom units, an ultraviolet sensitive photo-emissive cell peaking at 2800 angstrom units could be used and only the first surface reflection would be affected. Most common glass will not transmit radiations having a wave length below 3000 angstrom units and that used for photographic plates cuts off at 3100 angstrom units. Hence, the significance of this given wave length value.

By way of further example of this principle of overcoming the harmful effects of second surface reflection, let us suppose that the glass plates that were being tested are blue in color. Then, if a red filter was placed in the light beam and a measuring photocell sensitive to blue only was used, then there would be no second surface reflection difficulties entering into the measurement. This is because the blue glass would absorb all of the red light in transmission when considered on the basis of the blue sensitive medium, the measuring cell, and only the reflected light which would appear blue, would affect the measuring cell. In other words, if the radiation of the light beam is restricted to a wave length that the glass being tested will not transmit and the measuring cell is one which is sensitive only to wave lengths of the radiation reflected by the surface, then all second surface difficulties will be eliminated. Such a set of conditions should make possible slightly better curvature measurement, as well as much better ripple detection.

Although I have shown and described certain specific embodiments of my invention, I am fully aware that many modifications thereof are possible. My invention therefore is not to be limited to the precise details of construction shown and described, but is intended to cover all modifications coming within the scope of the appended claims.

Having thus described my invention what I claim is new and desire to secure by Letters Patent of the United States is:

1. An electro-optical system for determining the flatness of a reflecting surface comprising in combination means for supporting and moving the reflecting surface substantially in a given plane; means for projecting two separate and congruent areas of light onto said reflecting surface at an angle to the vertical and in constant spaced relation; a pair of light-sensitive cells connected in series relation; a mask in front of each cell; optical means, including said reflecting surface, for projecting the reflected images of said light areas onto opposite ones of said cells, whereby each of said masks cut off portions of the images from said cells, said masks being of such shape and so disposed relative to one another that so long as the relative spacing of the projected reflected images is constant corresponding to the cylindrical power of said optical means, when the included reflecting surface is flat, the sum of the outputs of the two cells will remain constant.

2. An electro-optical system according to claim 1 in which the masks have wedge-shaped apertures of equal dimension and are relatively disposed with the vertices of the apertures adjacent and lying on a line extending in the direction of movement of the reflected images resulting from a deviation of said reflecting surface from said given plane.

3. An electro-optical system according to claim 1 in which the areas of light are formed by illuminated slits, in which the masks have triangular openings of equal dimension and are relatively disposed with the vertices of the apertures adjacent and lying on a line which is substantially perpendicular to each of the projected reflected images of said slits.

4. An electro-optical system according to claim 1 in which the means for projecting the areas of light onto said reflecting surface includes a source of light and a pair of spaced optical slits illuminated thereby, and means for automatically compensating the output of said two light-sensitive cells in accordance with uncontrollable variations in the voltage in the line to which said source of light is connected.

5. An electro-optical system according to claim 4 in which said compensating means comprises a light-sensitive cell connected in a closed loop in bucking relation to said pair of serially-connected measuring cells.

6. An electro-optical system for determining the flatness of glass plates and automatically rejecting those not meeting specified tolerances comprising in combination means for supporting and successively moving a number of plates with the surface thereof to be tested exposed and lying substantially in a given plane; means for projecting two separate and congruent areas of light onto the exposed surface of said plates at an angle to the vertical and in constant spaced relation; a pair of light-sensitive cells connected in series relation; a mask in front of each cell; optical means, including the reflecting surface of said plates, for projecting the reflected images of said light areas onto opposite ones of said cells through said masks, said masks being of such shape and so disposed relative to one another that so long as the relative spacing of the projected reflected images is constant corresponding to the cylindrical power of said optical means, when the included reflecting surface of the plate is flat, the sum of the outputs of the two cells will remain constant, and means responsive to the output of said cells digressing from a given value for rejecting the plate responsible therefor.

7. An electro-optical system according to claim 6 in which said last-mentioned means includes an electric motor, the operation of which depends upon the output from said light-sensitive cells, and means for automatically paralyzing the motor circuit at all times when both areas of light are not projected on and reflected from the surface of a plate.

8. An electro-optical system according to claim 6 in which said last-mentioned means includes a normally inoperative reject unit adapted to indicate a plate for rejection, a normally-open switch controlling the operation of said unit, and a control unit responsive to the output of said cells and adapted to close said switch when the output of said cells digresses from a given value indicating the plate being tested is not flat.

9. An electro-optical system according to claim 6 in which the means for forming the areas of light includes a light source connected to a line susceptible to voltage fluctuation and including means for automatically compensating the measuring cell circuit in accordance with variations in the intensity of said light source, due to uncontrolled fluctuations in the line voltage feeding said light source.

10. An electro-optical system according to claim 9 in which the means for automatically compensating the measuring cell circuit comprises a third light-sensitive cell disposed to be illuminated by said light source, said cell connected in closed loop circuit and bucking relation to said two measuring cells and the means responsive to the output of said measuring cells being connected to said closed loop circuit in parallel with the measuring and compensating cells.

11. An electro-optical system according to claim 1 including means for eliminating the effects of second surface reflection when the plates being measured are transparent.

12. An optical system for determining the flatness of a reflecting surface comprising means for supporting the reflecting surface substantially in a given plane; means for projecting two separate and substantially congruent areas of light onto said reflecting surface at an angle to the vertical and in constant spaced relation; means for projecting the reflected images of said light areas separately onto a common image plane in constant spaced relation when the reflecting surface is flat; and means in said image plane for determining the spacing between said reflected images projected onto said image plane.

FORDYCE M. BROWN.